United States Patent
Botti et al.

(10) Patent No.: US 9,644,085 B2
(45) Date of Patent: May 9, 2017

(54) RUBBER TYRE COMPOUND PRODUCTION METHOD

(71) Applicants: Francesco Botti, Rome (IT); Riccardo Ascione, Rome (IT); Davide Privitera, Anzio (IT); Michele Amurri, Rome (IT); Pasquale Agoretti, Ariccia (IT)

(72) Inventors: Francesco Botti, Rome (IT); Riccardo Ascione, Rome (IT); Davide Privitera, Anzio (IT); Michele Amurri, Rome (IT); Pasquale Agoretti, Ariccia (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/903,358

(22) PCT Filed: Jul. 8, 2014

(86) PCT No.: PCT/IB2014/062952
§ 371 (c)(1),
(2) Date: Jan. 7, 2016

(87) PCT Pub. No.: WO2015/004605
PCT Pub. Date: Jan. 15, 2015

(65) Prior Publication Data
US 2016/0145424 A1 May 26, 2016

(30) Foreign Application Priority Data
Jul. 8, 2013 (IT) .............................. RM2013A0398

(51) Int. Cl.
C08K 3/36 (2006.01)
C08L 9/00 (2006.01)
C08L 9/06 (2006.01)
C08L 7/00 (2006.01)
B60C 1/00 (2006.01)
C08K 13/02 (2006.01)
C08K 5/00 (2006.01)
C08K 5/09 (2006.01)
C08K 5/36 (2006.01)
C08K 5/54 (2006.01)

(52) U.S. Cl.
CPC .......... C08L 9/00 (2013.01); B60C 1/00 (2013.01); B60C 1/0016 (2013.04); C08K 13/02 (2013.01); C08L 7/00 (2013.01); C08L 9/06 (2013.01); C08J 2307/00 (2013.01); C08J 2309/00 (2013.01); C08K 3/36 (2013.01); C08K 5/0025 (2013.01); C08K 5/09 (2013.01); C08K 5/36 (2013.01); C08K 5/54 (2013.01); C08K 2201/006 (2013.01); C08K 2201/014 (2013.01); C08L 2666/58 (2013.01)

(58) Field of Classification Search
None
See application file for complete search history.

(56) References Cited

U.S. PATENT DOCUMENTS

2011/0152434 A1* 6/2011 Schweitzer ............... C08L 9/06
524/493
2012/0016056 A1 1/2012 Miyazaki

FOREIGN PATENT DOCUMENTS

EP 2 568 003 A1 3/2013
EP 2 623 547 A1 8/2013
WO 2012/043858 A1 4/2012

OTHER PUBLICATIONS

Thesis of Maya, K. S., "Studies on in situ precipitated silica filled rubber composites with special reference to NR, NBR and SBR". Department of Polymer Science and Rubber Technology, Cochin University of Science and Technology. Jul. 2007. Retrieved from http://dyuthi.cusat.ac.in/purl/2548 on Dec. 15, 2016.*
International Search Report for PCT/IB2014/062952 dated Oct. 27, 2014 [PCT/ISA/210].
Written Opinion for PCT/IB2014/062952 dated Oct. 27, 2014 [PCT/ISA/237].

* cited by examiner

Primary Examiner — Richard A Huhn
(74) Attorney, Agent, or Firm — Sughrue Mion, PLLC

(57) ABSTRACT

A method of producing rubber compounds, in which the polymer base is composed partly of a first polymer material having a glass transition temperature of over −50° C., and partly of a second polymer material having a glass transition temperature of below −50° C. and silica as a filler. The method includes a preliminary first polymer material treating step, in which the first polymer material, a silica having a surface area of 80 to 135 $m^2/g$, a silane bonding agent, and at least one nucleophile agent are mixed together; a preliminary second polymer material treating step, in which the second polymer material, a silica having a surface area of 150 to 220 $m^2/g$, a silane bonding agent, and at least one nucleophile agent are mixed together; a mixing step, in which the compounds resulting from the preliminary treating steps are mixed together; and a final step, in which stearic acid and a curing system are added and mixed with the compound being produced.

7 Claims, No Drawings

RUBBER TYRE COMPOUND PRODUCTION METHOD

CROSS REFERENCE TO RELATED APPLICATIONS

This application is a National Stage of International Application No. PCT/IB2014/062952 filed Jul. 8, 2014, claiming priority based on Italian Patent Application No. RM2013A000398 filed Jul. 8, 2013, the contents of all of which are incorporated herein by reference in their entirety.

TECHNICAL FIELD

The present invention relates to a rubber tyre compound production method.

BACKGROUND ART

Silica has long been used as a reinforcing filler in tread compounds. Silica is used instead of carbon black and together with special chemical substances (silanes) which interact with the silanol groups of silica to prevent its particles from forming hydrogen bonds. With the right functionality, silanes may also interact with the polymer base to form a chemical bridge between it and the silica. Silica is employed for the advantages it affords in terms of rolling resistance and wet-road-holding performance.

To balance certain physical and mechanical compound properties, it is common practice within the industry to employ a polymer base comprising a mixture of polymers with different physical characteristics. Often, these differences are manifested in the form of different glass transition temperatures.

Using a mixture of polymers with different physical characteristics, however, can pose problems in terms of abrasion resistance. That is, the difference in rigidity of the polymers may result in local stress in the resulting polymer base, which has a negative effect on abrasion resistance.

A need is therefore felt for a method of producing compounds, in which the polymer base comprises a mixture of polymers with different glass transition temperatures, but without impairing the abrasion resistance characteristics of the compound.

The Applicant has surprisingly discovered a method of producing compounds, in which the polymer base comprises a mixture of polymers with different glass transition temperatures, with no problems in terms of abrasion resistance, and which surprisingly also affords advantages in terms of rolling resistance.

With respect to the known art, the method according to the present invention involves no increase in the amount of ingredients, and no additional ingredients in the compounds, but simply alters the timing with which they are mixed. In fact, as anyone skilled in the art knows, using too much or too many types of ingredients makes it difficult to control the various target properties of the compound.

DISCLOSURE OF INVENTION

The object of the present invention is a method of producing rubber compounds, in which the polymer base is composed partly of a first polymer material having a glass transition temperature of over −50° C., and partly of a second polymer material having a glass transition temperature of below −50° C. and comprising silica as a filler; said method being characterized by comprising a preliminary said first polymer material treating step, in which said first polymer material, a silica having a surface area of 80 to 135 $m^2/g$, a silane bonding agent, and at least one nucleophile agent are mixed together; a preliminary said second polymer material treating step, in which said second polymer material, a silica having a surface area of 150 to 220 $m^2/g$, a silane bonding agent, and at least one nucleophile agent are mixed together; a mixing step, in which the compounds resulting from the preliminary said first and second polymer material treating steps are mixed into one compound; and a final step, in which stearic acid and a curing system are added and mixed with the compound being produced.

Here and hereinafter, the term 'curing system' is intended to mean compounds, such as sulphur and possibly also accelerants, capable of cross-linking the polymer base.

Preferably, said nucleophile agent is in the curing accelerant class.

Preferably, the nucleophile agent in the curing accelerant class is selected from the group consisting of amines, disulphides, guanidines and derivatives thereof, thiourea and derivatives thereof, thiazoles, thiurams, sulphenamides and derivatives thereof, dithiocarbamates, dithiophosphates and xanthates; more preferably, the curing accelerant is in the group consisting of benzothiazyl-cyclohexyl-sulphenamide (CBS), N-tert-butyl-2-benzothiazylsulphenamide (TBBS), 2-mercaptobenzothiazole (MBT), zinc salts of 2-mercaptobenzothiazole (ZMBT), benzothiazyl-2-dicyclohexyl sulphenamide (DCBS), diphenylguanidine (DPG), triphenylguanidine (TPG), diorthotolyl-guanidine (DOTG), o-tolylbiguanidine (OTBG), diphenyl thiourea (DPTU), benzothiazole disulphide (MBTS), hexamethylenetetramine (HMT), tetrabenzyl thiuram disulphide (TBzTD), and mixtures thereof.

Preferably, in each of said preliminary treating steps, the amount of silica ranges from 10 to 80 phr with respect to the rubber present in the preliminary treating step.

Preferably, the polymer base used comprises 80 to 20 of said first polymer material, and 20 to 80 phr of said second polymer material.

Preferably, said first polymer material is a styrene-butadiene copolymer (SBR).

Preferably, said second polymer material is polybutadiene (BR) or natural rubber (NR).

A further object of the present invention is a compound produced using the method according to the present invention.

A further object of the present invention is a tyre portion made from the compound produced using the method according to the present invention.

A further object of the present invention is a tyre, at least one part of which is made from the compound produced using the method according to the present invention.

BEST MODE FOR CARRYING OUT THE INVENTION

The following are non-limiting examples for a clearer understanding of the present invention.

Examples

Six control compounds (Ctrl 1-Ctrl 6) and one compound according to the present invention (Inv.) were produced.

More specifically, compound Ctrl 1 relates to a known compound, in which all the polymer base, all the silica, all the silane bonding agent, and the stearic acid are added and mixed simultaneously at a first mixing step, whereas the nucleophile agents in the curing accelerant class are only mixed into the compound at the final mixing step, together with the curing system.

Compound Ctrl 2 differs from Ctrl 1 by involving a preliminary over −50° C. Tg polymer treating step, which comprises only mixing the over −50° C. Tg polymer with the 80-135 m²/g surface area silica and part of the silane bonding agent.

Compound Ctrl 3 differs from Ctrl 1 by involving a preliminary below −50° C. Tg polymer treating step, which comprises only mixing the below −50° C. Tg polymer with the 150-220 m²/g surface area silica and part of the silane bonding agent.

Compound Ctrl 4 differs from Ctrl 1 by involving both a preliminary over −50° C. Tg polymer treating step, as in Ctrl 2, and a preliminary below −50° C. Tg polymer treating step, as in Ctrl 3.

Compound Ctrl 5 differs from Ctrl 2 solely by the presence of the nucleophile agent at the preliminary over −50° C. Tg polymer treating step, and by only adding the stearic acid at the final mixing step.

Compound Ctrl 6 differs from Ctrl 3 solely by the presence of the nucleophile agent at the preliminary below −50° C. Tg polymer treating step, and by only adding the stearic acid at the final mixing step.

Compound Inv. according to the invention involves both preliminary treating steps, as in control compound Ctrl 4, plus the presence of the nucleophile agent at both preliminary treating steps, and only adding the stearic acid at the final mixing step.

Compound Ctrl 1 was produced as follows:
—Compound Preparation—
(First Mixing Step)

Prior to mixing, a 230-270-liter, tangential-rotor mixer was loaded with the ingredients shown in Table I to a fill factor of 66-72%.

The mixer was operated at a speed of 40-60 rpm, and the resulting compound unloaded on reaching a temperature of 140-160° C.

(Final Mixing Step)

The ingredients in Table I were added to the compound from the preceding mixing step to a fill factor of 63-67%.

The mixer was operated at a speed of 20-40 rpm, and the resulting compound unloaded on reaching a temperature of 100-110° C.

Control compounds Ctrl 2-Ctrl 6 and compound Inv. according to the invention were produced as follows:
—Compound Preparation—
(Preliminary Treatment of the Over −50° C. Tg and Below −50° C. Tg Portions of the Polymer Base)

Prior to mixing, a 230-270-liter, tangential-rotor mixer was loaded with the ingredients shown in Tables I-III to a fill factor of 66-72%.

The mixer was operated at a speed of 40-60 rpm, and the resulting compound unloaded on reaching a temperature of 140-160° C.

(Mixing Step)

Prior to mixing, a 230-270-liter, tangential-rotor mixer was loaded with the ingredients shown in Tables I-III to a fill factor of 66-72%.

The mixer was operated at a speed of 40-60 rpm, and the resulting compound unloaded on reaching a temperature of 140-160° C.

(Final Mixing Step)

The ingredients in Tables I-III were added to the compound from the preceding mixing step to a fill factor of 63-67%.

The mixer was operated at a speed of 20-40 rpm, and the resulting compound unloaded on reaching a temperature of 100-110° C.

Table I shows the compositions in phr of compounds Ctrl 1-Ctrl 3, and the steps in which the ingredients were added.

TABLE I

|  | Ctrl. 1 | Ctrl. 2 Preliminary treatment (Tg > −50° C.) | Ctrl. 3 Preliminary treatment (Tg < −50° C.) |
|---|---|---|---|
| E-SBR | — | 50 | — |
| BR | — | — | 50 |
| Silica* | — | 40 | — |
| Silica** | — | — | 40 |
| Silane bonding agent | — | 4 | 4 |
| Mixing step | | | |
| E-SBR | 50 | — | 50 |
| BR | 50 | 50 | — |
| Silica* | 40 | — | 40 |
| Silica** | 40 | 40 | — |
| Silane bonding agent | 8 | 4 | 4 |
| CB | 10 | 10 | 10 |
| Stearic acid | 2 | 2 | 2 |
| Final mixing step | | | |
| Sulphur | 1.4 | 1.4 | 1.4 |
| ZnO | 2.0 | 2.0 | 2.0 |
| DPG | 1.5 | 1.5 | 1.5 |
| MBTS | 1.0 | 1.0 | 1.0 |

E-SBR is a polymer base obtained by a process of polymerization in emulsion, with a mean molecular weight of 800-1500 × 10³ and 500-900 × 10³ respectively, a 20 to 45% styrene content, and used with a 0 to 30% oil content;
Silica* indicates silica with an 80 to 135 m²/g surface area and 40 to 70 nm particle diameter distribution;
Silica** indicates silica with a 150 to 220 m²/g surface area and 40 to 70 nm particle diameter distribution;

The silane bonding agent used is of formula $(CH_3CH_2O)_3Si(CH_2)_3SS(CH_2)_3Si(OCH_2CH_3)_3$ and is marketed by EVONIK under the trade name SI75;

DPG stands for diphenyl-guanidine;

MBTS stands for mercaptobenzothiazole disulphide.

Tables II and III show the compositions in phr of compounds Ctrl 4-Ctrl 6 and Inv., and the steps in which the ingredients were added.

The ingredients in Tables II and III are the same as in Table 1, and Mix 1 and Mix 2 stand for the compounds from the respective preliminary treatments.

TABLE II

|  | Ctrl. 4 | | Ctrl. 5 |
|---|---|---|---|
|  | Preliminary Treatment (Tg > −50° C.) | Preliminary Treatment (Tg < −50° C.) | Preliminary Treatment (Tg > −50° C.) |
| E-SBR | 50 | — | 50 |
| BR | — | 50 | — |
| Silica* | 40 | — | 40 |
| Silica** | — | 40 | — |
| Silane bonding agent | 4 | 4 | 4 |
| DPG | — | — | 0.5 |
| Mixing Step | | | |
| E-SBR | Mix 1 + Mix 2 | | — |
| BR | | | 50 |
| Silica* | | | — |
| Silica** | | | 40 |
| Silane bonding agent | | | 4 |
| CB | | 10 | 10 |
| Stearic acid | | 2 | — |
| Final Mixing Step | | | |

TABLE II-continued

|  | Ctrl. 4 | | Ctrl. 5 |
| --- | --- | --- | --- |
|  | Preliminary Treatment (Tg > −50° C.) | Preliminary Treatment (Tg < −50° C.) | Preliminary Treatment (Tg > −50° C.) |
| Stearic acid | — | | 2 |
| Sulphur | 1.4 | | 1.4 |
| ZnO | 2.0 | | 2.0 |
| DPG | 1.5 | | 1.0 |
| MBTS | 1.0 | | 1.0 |

TABLE III

|  | Ctrl. 6 | Inv. | |
| --- | --- | --- | --- |
|  | Preliminary treatment (Tg < −50° C.) | Preliminary treatment (Tg > −50° C.) | Preliminary treatment (Tg < −50° C.) |
| E-SBR | — | 50 | — |
| BR | 50 | — | 50 |
| Silica* | — | 40 | — |
| Silica** | 40 | — | 40 |
| Silane bonding agent | 4 | 4 | 4 |
| DPG | 0.5 | 0.5 | 0.5 |
| Mixing step | | | |
| E-SBR | 50 | Mix 1 + Mix 2 | |
| BR | — | | |
| Silica* | 40 | | |
| Silica** | — | | |
| Silane bonding agent | 4 | | |
| CB | 10 | 10 | |
| Final mixing step | | | |
| Stearic acid | 2 | 2 | |
| Sulphur | 1.4 | 1.4 | |
| ZnO | 2.0 | 2.0 | |
| DPG | 1.0 | 0.5 | |
| MBTS | 1.0 | 1.0 | |

The compounds in Tables I-III were tested to determine their rolling resistance and abrasion resistance related properties.

More specifically, dynamic properties were measured as per ISO Standard 4664 (as anyone skilled in the art knows, 60° C. tan δ values are closely related to, and indicative of, rolling resistance properties: the lower the 60° C. tan δ value, the better the rolling resistance); abrasion resistance was measured as per ISO Standard 4649.

Table IV (in which RR stands for rolling resistance, and AR for abrasion resistance) shows the results from the above tests, the values of which are indexed on the basis of the standard method control compound Ctrl 1 results.

TABLE IV

|  | Ctrl. 1 | Ctrl. 2 | Ctrl. 3 | Ctrl. 4 | Ctrl. 5 | Ctrl. 6 | Inv. |
| --- | --- | --- | --- | --- | --- | --- | --- |
| RR | 100 | 102 | 102 | 105 | 104 | 104 | 115 |
| AR | 100 | 103 | 103 | 107 | 108 | 108 | 125 |

As shown clearly in Table IV, compared with the control compounds, the compound produced using the method according to the present invention shows a marked improvement in rolling resistance, and an even more marked improvement in abrasion resistance.

The values in Table IV show the target advantages to be only achievable by combining all the characteristics indicated in Claim 1. Which characteristics can be summed up as the presence of both preliminary treating steps—in which the low Tg polymer is mixed with a high-surface-area silica and a nucleophile agent, and the high Tg polymer is mixed with a low-surface-area silica and a nucleophile agent—and the addition of stearic axis at the final mixing step, together with the curing system.

In fact, as shown by compounds Ctrl 2-Ctrl 6, even using only some of the above technical characteristics, the target advantages are achieved to a significant extent. More specifically, in the case of compounds Ctrl 2 and Ctrl 3, only one preliminary treating step is performed, with no nucleophile agent, and stearic acid is added prior to the final mixing step; in the case of compound Ctrl 4, both preliminary treating steps are performed, but with no nucleophile agent, and stearic acid is added prior to the final mixing step; and, in the case of compounds Ctrl 5 and Ctrl 6, stearic acid is only added at the final mixing step, but only one preliminary treating step is performed, albeit with the nucleophile agent.

The compound relative to the invention, on the other hand, by combining all the characteristics of the invention, achieves much higher rolling and abrasion resistance values.

The invention claimed is:

1. A method of producing a rubber compound, comprising:
   a preliminary first polymer material treating step in which a first polymer material having a glass transition temperature of over −50° C., a silica having a surface area of 80 to 135 m$^2$/g, a silane bonding agent, and at least one nucleophile agent are mixed together;
   a preliminary second polymer material treating step in which a second polymer material having a glass transition temperature of below −50° C., a silica having a surface area of 150 to 220 m$^2$/g, a silane bonding agent, and at least one nucleophile agent are mixed together;
   a mixing step, in which the mixtures resulting from the preliminary first and second polymer material treating steps are mixed into one compound; and
   a final step, in which stearic acid and a curing system are added to and mixed with the compound.

2. The method of producing a rubber compound as claimed in claim 1, characterized in that said nucleophile agents are curing accelerants.

3. The method of producing a rubber compound as claimed in claim 2, characterized in that the curing accelerants are selected from the group consisting of amines, disulphides, guanidines, and derivatives thereof, thiourea and derivatives thereof, thiazoles, thiurams, sulphenamides, and derivatives thereof, dithiocarbamates, dithiophosphates, and xanthates, and mixtures thereof; and preferably, the curing accelerants are selected from the group consisting of benzothiazyl-cyclohexyl sulphenamide (CBS), N-tert-butyl-2-benzothiazylsulphenamide (TBBS), 2-mercaptobenzothiazole (MBT), zinc salts of 2-mercaptobenzothiazole (ZMBT), benzothiazyl-2-dicyclohexyl sulphenamide (DCBS), diphenylguanidine (DPG), triphenylguanidine (TPG), di-ortho-tolyl-guanidine (DOTG), ortho-tolylbiguanidine (OTBG), diphenyl thiourea (DPTU), benzothiazole disulphide (MBTS), hexamethylenetetramine (HMT), tetrabenzyl thiuram disulphide (TBzTD), and mixtures thereof.

4. The method of producing a rubber compound as claimed in claim 1, characterized in that, in each of said preliminary polymer material treating steps, the amount of silica ranges from 10 to 80 phr with respect to the polymer material.

5. The method of producing a rubber compound as claimed in claim 1, characterized in that the rubber compound comprises 80 to 20 of said first polymer material and 20 to 80 phr of said second polymer material.

6. The method of producing a rubber compound as claimed in claim 1, characterized in that said first polymer material is a styrene-butadiene copolymer (SBR).

7. The method of producing a rubber compound as claimed in claim 1, characterized in that said second polymer material is polybutadiene (BR) or natural rubber (NR).

\* \* \* \* \*